(12) United States Patent
Etemad et al.

(10) Patent No.: US 9,203,563 B2
(45) Date of Patent: Dec. 1, 2015

(54) DEVICES AND METHODS FOR RADIO COMMUNICATION NETWORK GUIDED TRAFFIC OFFLOAD

(71) Applicant: Intel Corporation, Santa Clara, CA (US)

(72) Inventors: Kamran Etemad, Potomac, MD (US); Brent Elliott, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 317 days.

(21) Appl. No.: 13/687,442

(22) Filed: Nov. 28, 2012

(65) Prior Publication Data

US 2014/0003239 A1    Jan. 2, 2014

Related U.S. Application Data

(60) Provisional application No. 61/667,325, filed on Jul. 2, 2012.

(51) Int. Cl.
*H04L 1/18* (2006.01)
*H04W 28/08* (2009.01)
(Continued)

(52) U.S. Cl.
CPC ............ *H04L 1/1861* (2013.01); *H04L 1/1812* (2013.01); *H04L 5/0053* (2013.01);
(Continued)

(58) Field of Classification Search
CPC ..... H04W 28/08; H04W 28/10; H04W 36/22; H04W 16/08; H04W 28/0289; H04W 72/0413; H04W 72/046; H04W 68/00; H04W 48/12; H04W 52/0245; H04W 4/005; H04W 52/0206; H04W 72/005; H04W 72/042; H04W 72/0446; H04W 92/02; H04W 52/0212; H04W 24/10; H04W 88/08; H04L 1/1861; H04L 5/0053; H04L 5/14; H04L 5/0073; H04L 1/1812; H04L 5/0055; Y02E 40/62; Y02B 60/50
USPC ....................................... 370/230.1, 235, 237
See application file for complete search history.

(56) References Cited

U.S. PATENT DOCUMENTS

2008/0181184 A1* 7/2008 Kezys ........................... 370/338
2009/0219894 A1* 9/2009 Jee et al. ....................... 370/332
(Continued)

OTHER PUBLICATIONS

Tervonen, Janne. "Offloading Traffic from Cellular Networks with PBRM", Deliverable DA2.2.22 ICT SHOK Future Internet, Jun. 30, 2010, Phase 2.*

(Continued)

*Primary Examiner* — Paul H Masur
*Assistant Examiner* — Kabir Jahangir
(74) *Attorney, Agent, or Firm* — Schwegman Lundberg & Woessner, P.A.

(57) ABSTRACT

Discussed generally herein are enhanced Node Bs (eNodeBs) and User Equipment (UE) arranged for offloading UE traffic from a communications node and techniques for the same. An eNodeB can include processing circuitry arranged to obtain traffic load information of one or more WiFi access points within a coverage area of the eNodeB and produce corresponding offload guidance information, the traffic load information includes information about user equipment (UE) traffic flows on the one or more WiFi access points. The eNodeB can include a transceiver arranged to transmit the offload guidance information to one or more UEs and arranged to receive a request from at least one of the UEs to move at least some of the UE traffic flows to one of the WiFi access points.

20 Claims, 3 Drawing Sheets

(51) Int. Cl.

| | |
|---|---|
| *H04W 24/10* | (2009.01) |
| *H04W 72/04* | (2009.01) |
| *H04W 52/02* | (2009.01) |
| *H04W 72/00* | (2009.01) |
| *H04W 92/02* | (2009.01) |
| *H04L 5/00* | (2006.01) |
| *H04W 4/00* | (2009.01) |
| *H04W 36/22* | (2009.01) |
| *H04L 5/14* | (2006.01) |
| *H04W 48/12* | (2009.01) |
| *H04W 68/00* | (2009.01) |
| *H04W 88/08* | (2009.01) |

(52) U.S. Cl.
CPC ............ *H04L5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 88/08* (2013.01); *Y02B 60/50* (2013.01); *Y02E 40/62* (2013.01)

(56) References Cited

U.S. PATENT DOCUMENTS

| | | | | |
|---|---|---|---|---|
| 2011/0058479 | A1* | 3/2011 | Chowdhury | 370/237 |
| 2011/0075557 | A1* | 3/2011 | Chowdhury et al. | 370/230 |
| 2011/0103495 | A1* | 5/2011 | Hall | 375/260 |
| 2011/0222523 | A1* | 9/2011 | Fu et al. | 370/338 |
| 2011/0317571 | A1* | 12/2011 | Kokkinen et al. | 370/252 |
| 2012/0020260 | A1* | 1/2012 | Chen et al. | 370/310 |
| 2012/0023189 | A1* | 1/2012 | Giaretta et al. | 709/217 |
| 2012/0113965 | A1 | 5/2012 | Puthenpura et al. | |
| 2012/0230191 | A1* | 9/2012 | Fang | 370/235 |
| 2012/0269134 | A1* | 10/2012 | Jin et al. | 370/328 |
| 2013/0070594 | A1* | 3/2013 | Garcia Martin et al. | 370/235 |
| 2013/0179732 | A1* | 7/2013 | Alanis et al. | 714/27 |
| 2013/0242965 | A1* | 9/2013 | Horn et al. | 370/338 |
| 2013/0286826 | A1* | 10/2013 | Park et al. | 370/230 |
| 2014/0003322 | A1* | 1/2014 | Grinshpun et al. | 370/312 |

OTHER PUBLICATIONS

Intel Corporation, "Discussions on Carrier Aggregation across LTE and WIFI", TSG-RAN vol. 53, 3GPP RP-111094, Sep. 2011, paes 4.*

QualComm, "3G/WiFi Seamless Offload", Mar. 2010, pp. 11.*

"Clarification on the scope of ISRP Filter Rule priority", LG Electronics, S2-115168, 3GPP TSG-SA2 Meeting #88, (Nov. 2011), 1-4.

"International Application Serial No. PCT/US2013/047576, International Search Report mailed Oct. 18, 2013", 3 pgs.

"International Application Serial No. PCT/US2013/047576, Written Opinion mailed Oct. 18, 2013"; 5 pgs.

"Solution with Inter-APN Routing Policies", Motorola Mobility, S2-111733, 3GPP TSG SA WG2 Meeting #84, (Apr. 2011), 1-4.

Tervonen, Janne, "Offloading Traffic from Cellular Networks with PBRM", Deliverable DA2.2.22, ICT SHOK Future Internet Programme, (Jun. 30, 2010), 39 pgs.

"International Application Serial No. PCT/US2013/047576, International Preliminary Report on Patentability mailed Jan. 15, 2015", 7 pgs.

* cited by examiner

DEVICES AND METHODS FOR RADIO COMMUNICATION NETWORK GUIDED TRAFFIC OFFLOAD

CLAIM OF PRIORITY

This application claims benefit of priority, under 35 U.S.C. Section 119(e), to U.S. Patent Application No. 61/667,325, filed on Jul. 2, 2012, which is hereby incorporated by reference herein in its entirety.

TECHNICAL FIELD

This disclosure relates generally to communication networks and more specifically to managing traffic in communication networks.

BACKGROUND ART

Historically, communications networks have been independently standardized, developed, deployed, and operated. Multiple communications technologies can be interwoven in client devices and communication infrastructures. This can increase levels of use and congestion on Wireless Wide Area Networks (WWAN), Wireless Local Area Networks (WLAN), and Wireless Personal Area Networks (WPAN).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DESCRIPTION OF EMBODIMENTS

In the following detailed description, reference is made to the accompanying drawings that form a part hereof, and in which is shown by way of illustration specific embodiments in which the inventive subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

An increase in usage and congestion in WWAN and WLAN/WPAN systems has motivated work on cooperative communications networks that can include Radio Access Network (RAN) level optimizations. A solution to help alleviate the congestion can include network guided (e.g., directed or assisted) traffic offload for one or more devices connected to the network. This can include broadcasting offload guidance information to devices in idle mode.

Discussed generally herein are systems and techniques for offloading traffic from one or more devices from a first communications node to a second communications node, such as a first communications node that uses a different Radio Access Technology (RAT) than the second communications node. For example, the first communications node can be a Long Term Evolution (LTE) Enhanced Node B (eNodeB) and the second communications node can be a WiFi Access Point (AP). An eNodeB can include processing circuitry arranged to obtain traffic load information of one or more WiFi access points within a coverage area of the eNodeB and produce corresponding offload guidance information, the traffic load information includes information about user equipment (UE) traffic flows on the one or more WiFi access points. The eNodeB can include a transceiver arranged to transmit the offload guidance information to one or more UEs and arranged to receive a request from at least one of the UEs to move at least some of the UE traffic flows to one of the WiFi access points.

A possible solution can include broadcasting, multicasting, or unicasting to connected or idle devices to assist or manage traffic (e.g., application or device flow) offloading across WWAN and WLAN. Such solutions can include offloading traffic from an individual device or one or more groups of devices simultaneously. The network can send offload guidance information, such as traffic attributes or traffic suggestions, to allow for traffic offload. The offload can be managed by Radio Resource Control (RRC) signaling. The offload can be statistical or gradual, such as to get devices to switch from one using one communications node to another communications node with a certain probability. The offload can be from or to a WWAN or a WLAN/WPAN. The offload can be a function of a Quality of Service (QoS) class (e.g., service flow type) of an application or flow to be offloaded.

Figure 1:
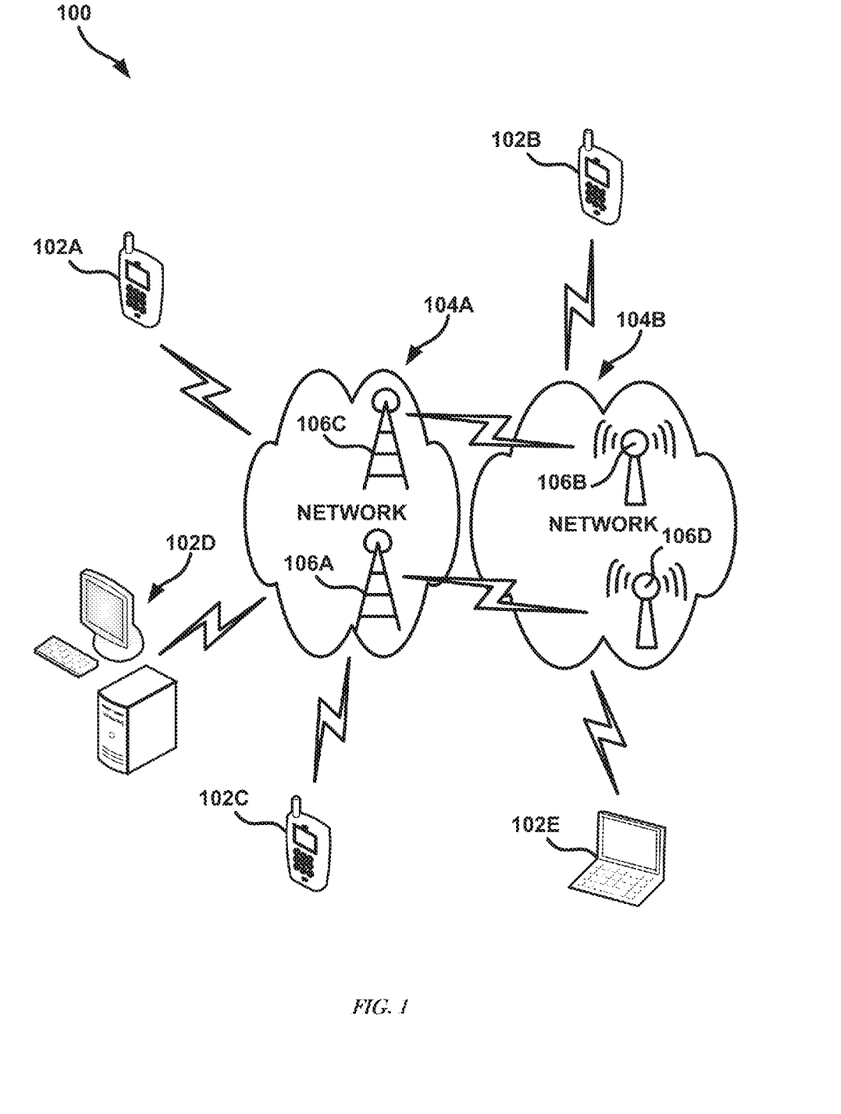
FIG. 1 shows an example of a communications network.

FIG. 1 shows an example of a communications network system 100 that can include devices 102A-E communicatively coupled to first or second networks 104A-B. The networks 104A-B can include a plurality (e.g., one or more sets) of communications nodes 106A-D (e.g., eNodeBs or APs). The network 104A can be a WWAN and the network 104B can be a WLAN. The networks 104A and 104B can be communicatively coupled, such as through a wired or wireless connection. The networks 104A and 104B can share traffic load information with each other. A communications node 106A-D, such as an eNodeB or AP, can include a radio transceiver, a control module, processing circuitry arranged to receive traffic load information about communications nodes 106 within the coverage area of the communications node and produce offload guidance information as a function of the traffic load information, or a power supply. The traffic load information can include information about UE traffic flows on the respective communications node 106. The communications node 106A-D can be the access point of the communications network 104.

The devices 102 (e.g., UEs) can be a mobile device 102A-C, such as a Smartphone or personal digital assistant (PDA), a desktop computer 102D, or a laptop computer 102E, such as a tablet. The devices 102 can include one or more policies stored in a memory of the device 102 that can be implemented by the device 102. For example, a policy can include rules or guidelines for when the device 102 should communicate using a different network 104 than one it is currently coupled to. The device 102 can transmit information (e.g., offload guidance information or other data) to and receive information from the communications node(s) 106 (e.g., radio access network(s)). Information transmitted by the device 102 can include a request to move one or more traffic flows of the device 102 to a different communications node 106. Information received from the communications node 106 can include offload guidance information. Transmitting and receiving information using the device 102 can include using a transceiver of the device 102.

A communication from the network 104, such as a communications node 106, to the device 102 can use a variety of signaling schemes, such as dedicated (e.g., unicast), multicast, or broadcast signaling, and can be over a variety of different network 104 types, such as WWAN, WLAN, WPAN, or cellular network. A dedicated signaling scheme can be used when a communication is to be sent to a single device 102 coupled to the network 104. Multicasting can be used when a communication is to be sent to multiple devices 102 coupled to the network 104. Broadcast signaling can be used when a communication is to be sent to multiple devices 102 that are coupled to the network 104 and/or in idle mode. A broadcast can include a System Information Block (SIB) message, such as a newly defined SIB or extended SIB or an extension to an existing SIB, such as SIB4 in a Third Generation Partnership Project (3GPP) LTE network.

When offload guidance information from the network 104, such as from a communications node 106 of the network 104, indicates that loading conditions (e.g., traffic) on a communications node 106 has changed, or will change, a device 102 can implement a different policy as a function of the offload guidance data. The device 102 can switch policies as a function of offload guidance data that is representative of loading level, an emergency condition, or an anticipated change in traffic conditions. For example, when the device 102 is inside a high speed train leaving or approaching a train stop or when the device 102 is at or near a special event such as a sports game, a convention, or a bus/train station, the network 104 or communications node 106 can communicate information to the device 102 to convey that a change in traffic conditions on the network 104 or communications node 106 can be approaching. Such a configuration can allow the device 102 to implement a contextually relevant policy. The offload guidance information can include an index indicating which policy the device 102 receiving the offload guidance information should implement.

The communications node 106 can implement a managed or group offload. The managed or group offload can be accomplished using multicasting, broadcasting, or dedicated signaling. The offload can occur at an interface layer (e.g., across flows running on a given radio interface), such that at least some of the traffic from a device 102 using an interface can be switched to another interface, or as a function of traffic flow or one or more applications using the communications node 106. For example, applications with frequent, periodic synchronization that are using a WWAN (e.g., LTE) network 104A or communications node 106A can be switched over to a WLAN (e.g., WiFi) network 104B or communications node 106B. The switch can result in all communications on the communications node 106A or only a specific flow (e.g., a flow of a specific QoS class) or application requiring periodic synchronization being transitioned. Such a technique can reduce the WWAN signaling overhead associated with such applications. The offload can be a function of a QoS class associated with the device 102 traffic. For example, a higher priority process, such as an application running on a device 102, can be offloaded to a less congested communications node 106, while a lower priority process may not get offloaded. Examples of higher priority applications or flows (e.g., applications or flows with a higher QoS class identifier) can include video conferencing, teleconferencing, or the like. Examples of lower priority applications or flows (e.g., applications or flows with a lower QoS class identifier) can include file downloading or internet browsing.

A policy implemented in a memory storage device of the communications node 106 can implement a probabilistic load balance function. One or more devices 102 can offload their traffic (e.g., be moved or transitioned) from/to WLAN communications node 106B to/from WWAN communications node 106A with some probability using the probability load balance function. The probability can be determined using a probabilistic offload seed value sent from the network 104 or communication node 106. Similar to managed or group offload, the probabilistic load balance can be implemented at an interface layer or as a function of flow (e.g., congestion, overload, etc.), the type of application using the communications node 106, or a QoS class, such as a QoS class of the application(s) using the communications node 106.

The communications node 106 can include a transceiver arranged to transmit offload guidance information to one or more UEs. The transceiver can be arranged to receive information from a UE including an indicator or request that indicates the UE would like to move at least some of its traffic flows off of the communications node 106.

The network 104 or communications node 106 can suggest the device take an action, such as make a measurement or switch its traffic from to another network 104 or communications node 106. The measurement can be a received signal strength indication (RSSI), a signal to noise ratio (SNR), a percentage of missed beacons, a velocity, a position, a frame or packet error rate (FER or PER), data rate, etc. A policy implemented on the device 102 can determine if the device 102 will offload some or all of its traffic to another communications node 106 as a function of the measurement or suggestion. Similar to managed or group offload, the suggested measurement or handover can be implemented at an interface layer or as a function of flow, one or more applications using the communications node 106, or an associated QoS class.

The communications node 106 can implement a policy that forces at least some traffic to move to an alternative communications node 106 unconditionally, such as a function of an emergency flag. When the emergency flag indicates that an emergency situation (e.g., a disaster situation, there is network 104 downtime, or the communications node 106 is at least temporarily inoperable, mostly inoperable, or the like) the network or communications node 106 can force the device 102 to switch to another network 104 or communications node 106.

The network 104 can provide a wide variety of offload guidance information to the device 102, such as through one or more of the communications nodes 106. The information can be sent as a function of a policy implemented by the network operator, the network 104 or local conditions, or projected (e.g., expected) congestion conditions. The information can be provided to the device 102 using unicast (e.g., dedicated signaling), multicast, or broadcast signaling.

The offload guidance information can include WLAN or WWAN network 104 information, such as a network 104 or communication node 106 identifier, a communications node 106 (e.g., access point) or network preference level, radio parameters, a measurement request, a minimum QoS class identifier, an offload randomization seed, a switching hysteresis variable (e.g., value), an emergency flag, a traffic load level on the target communications node 106, or credentials or other information for access to the target communications node 106 or network 104. The AP (e.g., access port) specific information can include a WLAN or WWAN network identifier. A WWAN network or communication node identifier (e.g., eNodeB identifier) can include a cell identification. A WLAN network identifier can be a Service Set Identifier (SSID), Extended SSID (ESSID), or Homogeneous ESSID (HESSID). The SSID, ESSID, or HESSID can be aligned with an Access Network Discovery and Selection Function (ANDSF) WLAN network profile that has been defined or provided, such as by the operator or the user. The ESSID or other profile identifier can be used as a reference to an existing provisioned profile (e.g., through ANDSF). Such a configuration can save overhead in determining or creating a profile and can tie the profile with a provisioning system. Using identifiers based on provisioned profiles can relieve a network 104 or communications node 106, such as a RAN base station or a WiFi access point, from needing to know the details of a provisioned policy. The network identifier can be sent in situations where a device 102 is roaming. A Radio Access Network (RAN) base station can be a radio access node of a WWAN, such as a NodeB of a High Speed Packet Access (HSPA) or Universal mobile telecommunications system Terrestrial Radio Access (UTRA) Network, or an eNodeB of an LTE or Enhanced UTRA (EUTRA) 3GPP network.

The access point preference level can include two or more preference levels. For example, access point preference level can be a two digit binary number that specifies four different preference levels (e.g., preferred, normal, non-preferred, and inaccessible or otherwise reserved). Preference levels can be quantitative and based on radio loading, backhaul loading, etc. The access point preference level can be set by the communications node 106 or the network 104. In some examples, recommending or suggesting a move to another communications node 106 does not include specifying the communications node 106 to transfer to. An access point preference level or existing service provider subscriptions present on the device 102 can be used to determine which communications node 106 the device 102 should be offloaded or transitioned to. A communications node 106 can be recommended or discovered and prioritized or de-prioritized, and the device 102 can choose which one to transition to accordingly. For example, a long term evolution (LTE) provider (e.g., roaming or home) can prioritize or de-prioritize WiFi communications nodes 106B and 106D and use parameters like AP preference level or one or more of the radio parameters to decide which communications node 106 to switch to. A communications node 106C can request a device 102 to collect information about a nearby communications node 106D and its associated traffic data (e.g., offload guidance information). The device 102 can decide whether or not to switch at least some of its traffic to communications nodes 106D as a function of this information.

Offload guidance information can include an index to an offload policy pre-provisioned on the device to be used. The index can be determined based on dynamic traffic loading, an emergency condition, or other consideration that can be determined by the communications node 106 or network 104 and communicated to the device 102, such as other offload guidance information. The policies on a device 102 can include different characteristics, such as a policy that tends to keep device 102 traffic on the network 104 it is currently using or a policy that tends to switch the device 102 traffic to a network 104 or communications node 106 that has less congestion.

The radio parameters that can be included in the offload guidance information and can include a specific a target communications node 106 identifier(s), a frequency band(s) allowed on the target communications node 106, a traffic load level on the target communications node 106, or a maximum data rate of the communications node 106. As used herein "target communications node" means a communications node 106 which the UE might be able to offload its traffic to.

The measurement request can indicate that the device 102 should send measurement information to the communications node 106. The measurement request can ask for a received signal strength indication (RSSI), a signal to noise ratio (SNR), a percentage of missed beacons, a velocity, a position, a frame or packet error rate (FER or PER), or other measurement(s). The measurement request can be sent to the device 102 at or around the time a trigger condition has occurred. For example, the device 102 can be arranged to provide measurement reports periodically or based on when PER or FER exceed a threshold value or RSSI falls below a threshold for a period of time.

The minimum QoS class identifier can indicate a minimum QoS class identifier of the traffic to be offloaded. For example, when the minimum QoS class identifier indicates that applications or flows with a normal priority should be offloaded all devices or applications with a normal QoS class identifier or greater (e.g., high priority can be included in this group) can be offloaded. A maximum QoS class identifier could also, or alternatively, be used to determine what device 102 traffic the communications node 106 is fit to handle.

The minimum QoS class identifier, or maximum QoS class identifier, and offload seed (e.g., probabilistic offload seed) can be set in conjunction with one another to increase or decrease incoming or outgoing flows or device 102 traffic from one communications node 106 to another. The QoS class identifier can be the same as defined in WWAN (e.g., LTE). The QoS class identifier or the offload seed can be set to extreme values such that at least some device 102 traffic is moved to another communications node 106D or brought back to the original communications node 106C with a high degree of certainty, such as absolute certainty. The number calculated using the offload seed can determine if the device 102 will switch applications or other processes that are above the minimum QoS class identifier to another communications node 106.

The switching hysteresis can be used by a device 102 which has been offloaded to a new communications node 106 to recalculate the randomization number, such as with a bias toward staying on the same radio network or communications node 106 to try to help avoid switching back to the original communications node 106. Such a parameter can reduce the probability of unnecessary switching of traffic between a WWAN communications node 106A and a WLAN communications node 106B. Alternatively or additionally, the switching hysteresis can include a minimum amount of time device 102 traffic must use the communications node 106 it is currently using before it can be switched to another communications node 106.

The emergency flag can indicate to a device 102 that it needs to follow the communications node 106 suggestions unconditionally. For example, an emergency flag can be sent to a single device 102A indicating that WWAN network 104A access is about to be unavailable and that it must switch its traffic to WLAN network 104B. In one or more embodiments, the emergency flag can be multicast or broadcast to a plurality of devices 102 to indicate that the devices need to switch to another communications node 106 or network 104 unconditionally.

Offload guidance information can be tailored to a specific device 102 or can be the same for every device 102 it is sent to. For example, the network identifier, communications node 106 preference level, radio parameters, or minimum QoS class identifier can be uniformly sent to a plurality of devices

102. In one or more embodiments, the offload seed, switching hysteresis, or policy index can be individualized for a specific device 102.

Figure 2:
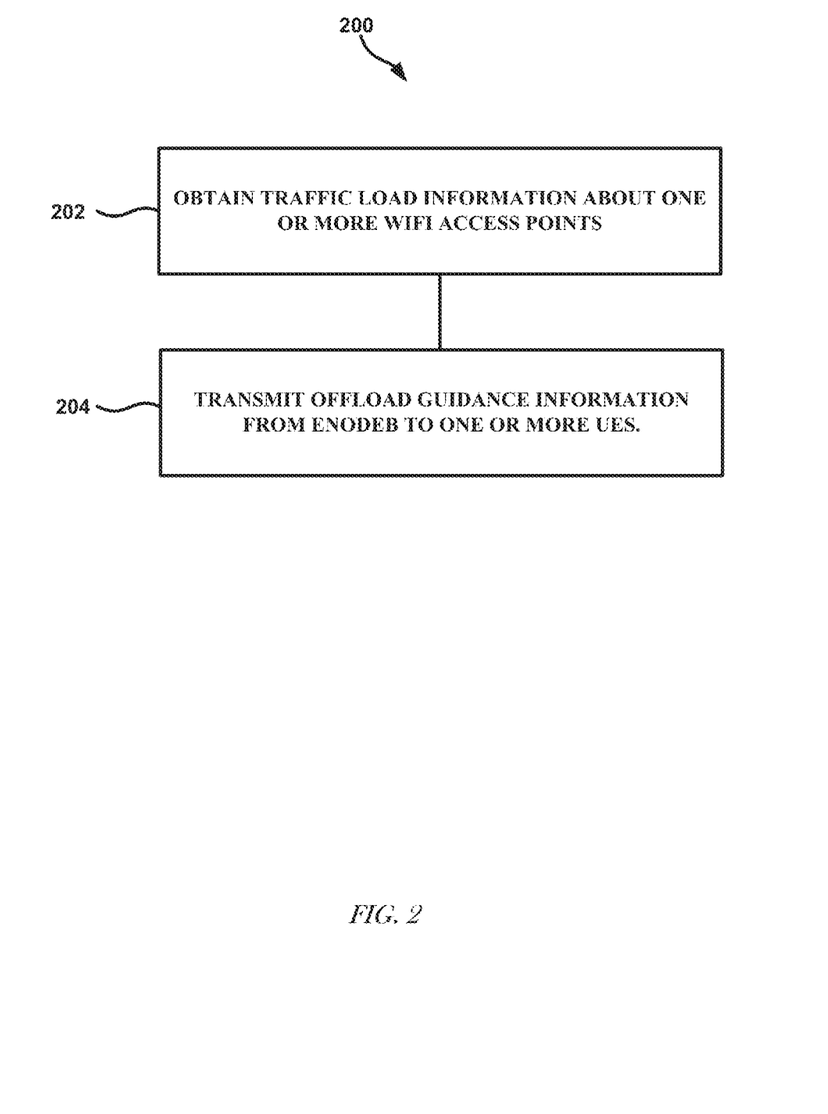
FIG. 2 shows an example of a technique of offloading devices from one communications node to another.

FIG. 2 shows an example of a technique 200 for offloading a device 102 from a communications network 104. At 202, traffic load information about one or more WiFi access points can be obtained. At 204, offload guidance information can be transmitted from an eNodeB to one or more UEs. Offload guidance information can be sent from a network 104 or communications node 106 to two or more devices 102A-B. The offload guidance information can correspond to communications traffic on a first network 104 (e.g., a communications node 106) and can include a suggestion to use a second network 104 for communications with a certain probability. Transmitting offload guidance information can include transmitting an emergency flag. When an emergency flag is transmitted, the suggestion to use the second network can include a suggestion to use the second node with a probability of one. The offload guidance data transmitted can include any information sent to the device 102 from the network 104 or communications node 106 discussed herein. A device 102 of the two or more devices 102 can have traffic offloaded from a first network 104 or communications node 106 to the second network 104 or communications node 106 as a function of the offload guidance information. The offloading can be done as a function of a comparison of a number calculated as a function an offload seed included in the offload guidance information to a threshold defined in a policy associated with the device to be offloaded, or as a function of a QoS class identifier of an application running on the device 102.

Offloading a device 102 can be accomplished by the device 102 initiating the offload, such as by transmitting handover signaling to the network 104 or communications node 106 that it is currently using or that it is switching traffic to. The network 104 or communications node 106 that it is currently using can then move the traffic from the device 102 to the other network 104 or communications node 106. In the case of a WiFi network 104B or communications node 106B, 106D the network 104B or communications node 106B, 106D can authorize the offload to or from the network 104B or communications node 106B, 106D. The device 102 can determine if it wants to switch its traffic (e.g., flows or applications) to a different communications node 106 or network 104. The device 102 can also determine which communications node 106 or network 104 its traffic gets switched to.

Figure 3:
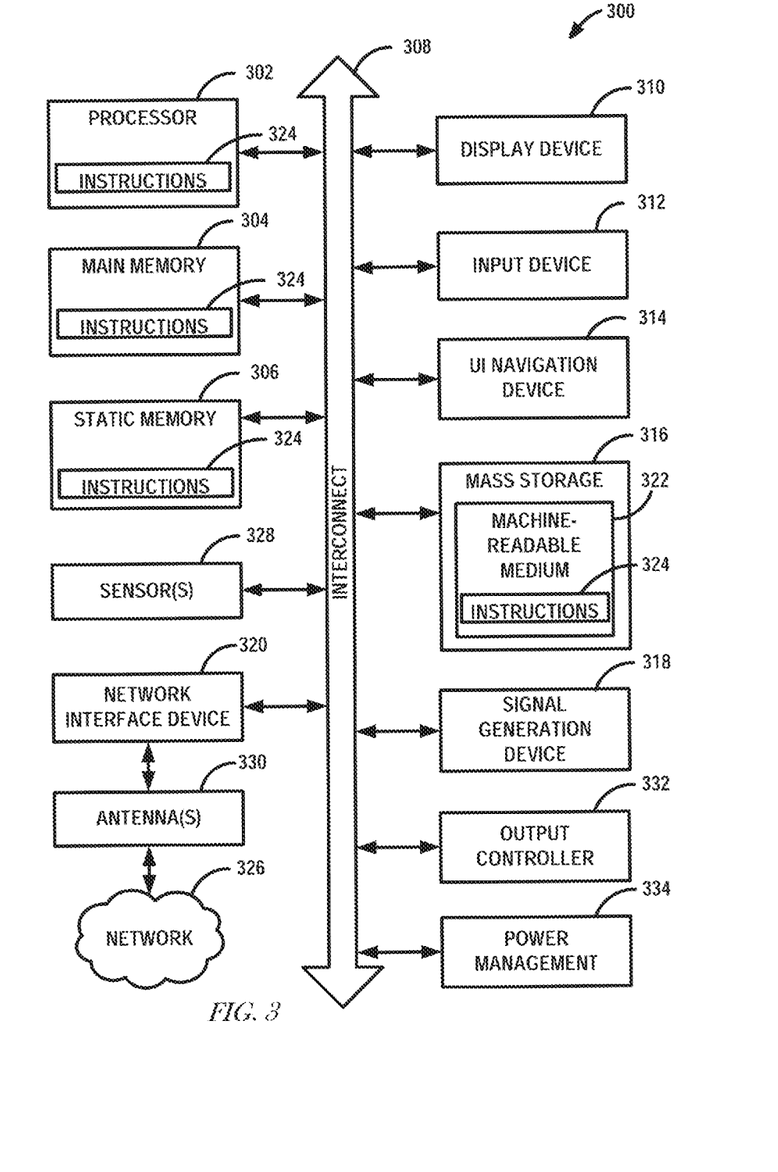
FIG. 3 shows an example of a computer to implement techniques.

FIG. 3 is a block diagram illustrating an example computer system machine upon which any one or more of the techniques herein discussed may be run, such as a computer system implemented in a UE or a RAN base station. Computer system 300 may be embodied as a computing device, providing operations of a device 102 (from FIG. 1), or any other processing or computing platform or component described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The computer system machine may be a personal computer (PC) that may or may not be portable (e.g., a notebook or a netbook), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 300 includes a processor 302 (e.g., a central processing unit (CPU), a graphics processing unit (GPU) or both), a main memory 304 and a static memory 306, which communicate with each other via an interconnect 308 (e.g., a link, a bus, etc.). The computer system 300 may further include a video display unit 310, an alphanumeric input device 312 (e.g., a keyboard), and a user interface (UI) navigation device 314 (e.g., a mouse). In one embodiment, the video display unit 310, input device 312 and UI navigation device 314 are a touch screen display. The computer system 300 may additionally include a storage device 316 (e.g., a drive unit), a signal generation device 318 (e.g., a speaker), an output controller 332, a power management controller 334, and a network interface device 320 (which may include or operably communicate with one or more antennas 330, transceivers, or other wireless communications hardware), and one or more sensors 328, such as a GPS sensor, compass, location sensor, accelerometer, or other sensor.

The storage device 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computer system 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the suggestion engine can include a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Embodiments may also be implemented as instructions stored on a computer-readable storage device or storage medium, which may be read and executed by at least one processor to perform the operations described herein. A computer-readable storage device or storage medium may include any non-transitory mechanism for storing information in a form readable by a machine (e.g., a computer). For example, a computer-readable storage device or storage medium may include read-only memory (ROM), random-access memory (RAM), magnetic disk storage media, optical storage media, flash-memory devices, and other storage devices and media. In some embodiments, the electronic devices and computing systems described herein may include one or more processors and may be arranged with instructions stored on a computer-readable storage device.

Examples, as described herein, may include, or may operate on, logic or a number of components, modules, or mechanisms. Modules are tangible entities (e.g., hardware) capable of performing specified operations and may be arranged or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be arranged by firmware or software (e.g., instructions, an application portion, or an application) as a module that operates to perform specified operations. In an example, the software may reside on a machine An advantage of one or embodiments can include reducing congestion on a communications node 106. Another advantage can include an increased device 102 and communications node 106 awareness of expected or predicted future traffic conditions on the network 104 and communications nodes 106. Another advantage can include more reliable communications network 104 access for applications or devices with certain QoS class identifiers.

Another advantage can include providing a device 102 with the ability to provide context useful in assisting the device 102 to select appropriate policies from a local cache. For example, the communications node 106 can have a greater contextual understanding of the area through node traffic data that can enable it to inform the devices 102 communicatively coupled thereto or nearby of the contextual understanding. For example, the communications node 106 can transmit data to such communicatively coupled or nearby devices 102 that they are on a train with local WiFi and that the train is about to leave or arrive, or that the devices are on a plane that is about to take off or land (e.g., requiring radios to be shut off). Such a system can provide visibility into signaling versus payload overload in the network 104. Such a system can also provide for the sharing of information (e.g., node traffic data) with devices 102 not directly associated with the communications node 106.

Another advantage can include a communications node 106 making a suggestion, instead of a mandate or a probabilistic suggestion, to transition. Such a suggestion can allow the device 102 to make the decision about how to respond to the suggested transition as a function of received node traffic data or other conditions.

Another advantage can include sharing information (e.g., node traffic data, offload guidance information, mandates, or suggestions (probabilistic or otherwise)) using group communications, such as using broadcast or multicast mechanisms.

Another advantage can include creating a system including communications nodes 106 with greater autonomy to deliver information independent of a core network. Such a configuration can allow the dissemination of local context which is available locally to the communications node 106.

Another advantage can include improved (e.g., reduced) power consumption by the devices 102. Another advantage can include reduced cost for the access provider or user of the device 102. Another advantage can include easier compliance with government safety requirements or improved operation of public safety usage models. Another advantage can include enhanced security such as encryption of the device 102 communications.

ADDITIONAL NOTES AND EXAMPLES

In Example 1, an eNodeB includes a transceiver and processing circuitry.

In Example 2, the processing circuitry of Example 1 can be arranged to obtain traffic load information of one or more WiFi access points within a coverage area of the eNodeB and produce corresponding offload guidance information.

In Example 3, the traffic load information of at least one of Examples 1-2 can include information about user equipment (UE) traffic flows on the one or more WiFi access points.

In Example 4, the transceiver of at least one of Examples 1-3 can be arranged to transmit the offload guidance information to one or more UEs and arranged to receive a request from at least one of the UEs to move at least some UE traffic flows from the eNodeB to one of the WiFi access points.

In Example 5, the offload guidance information of at least one of Examples 1-4 includes data representative of one or more parameters related to a WiFi access point of the one or more WiFi access points, the parameters including one or more of (1) a WiFi access point identifier, (2) an offload preference level for the WiFi access point, (3) a traffic load level on the WiFi access point, (4) frequency bands allowed on the WiFi access point, or (5) a max data rate of the WiFi access point.

In Example 6, the offload guidance information of at least one of Examples 1-5 includes an offload preference level for the one or more WiFi access points that a UE of the plurality of UEs can request to switch traffic to.

In Example 7, the offload guidance information of at least one of Examples 1-6 includes common guidance information that is eNodeB independent, the common guidance information including one or more of: (1) a minimum quality of service class identifier, (2) a probabilistic offload seed, (3) an emergency indicator; (4) a switching hysteresis value; or (5) a policy index.

In Example 8, the traffic flows on the eNodeB of at least one of Examples 1-7 includes one or more service flows, and the offload guidance information includes a minimum quality of service class identifier indicating which service flows of the one or more service flows can apply the offload guidance information and request to switch to a specific access point.

In Example 9, the offload guidance information of at least one of Examples 1-8 includes a probabilistic offload seed, wherein the probabilistic offload seed is a randomization number which determines a probability of one or more traffic flows from the plurality of UEs being offloaded to an access point.

In Example 10, the offload guidance information includes an index to an offload policy of a plurality of offload policies on a UE of the one or more UEs.

In Example 11, the offload guidance information includes an emergency indicator that indicates to the UE to request to switch UE traffic flows from the eNodeB to a WiFi access point of plurality of WiFi access points unconditionally.

In Example 12, the offload guidance information includes a switching hysteresis value, wherein the switching hysteresis value is arranged to avoid the UE repeatedly requesting to switch traffic from and to the eNodeB or WiFi access point.

In Example 13 a UE includes a transceiver arranged to receive offload guidance information from an eNodeB or a WiFi access point.

In Example 14, the UE of at least one of Examples 1-13 includes a memory including one or more offload policies stored thereon.

In Example 15, the UE of at least one of Examples 1-14 is arranged to request the eNodeB or WiFi access point to offload at least some of the UE's traffic on the eNodeB or the WiFi access point to the WiFi access point or eNodeB as a function of the offload guidance information and the one or more offload policies.

In Example 16, the offload guidance information of at least one of Examples 1-15 includes one or more of a probabilistic offload seed, an emergency indicator, a policy index, or a switching hysteresis value.

In Example 17, the UE of at least one of Examples 1-16 is arranged to calculate a random number as a function of the probabilistic offload seed and request to offload at least some of its traffic from the eNodeB or the WiFi access point as a function of the random number.

In Example 18, when the random number of at least one of Examples 1-17 is above a threshold the UE is arranged to transmit a request to the eNodeB or the WiFi access point to offload the UE's traffic that is at or above a minimum quality of service class identifier.

In Example 19, the emergency indicator of at least one of Examples 1-18 indicates that the UE is to unconditionally request to offload its traffic from the eNodeB or WiFi access point.

In Example 20, the switching hysteresis value of at least one of Examples 1-19 is arranged to avoid the UE traffic repeatedly requesting to switch traffic from and to the eNodeB or WiFi access point.

In Example 21, the policy index of at least one of Examples 1-20 indicates to the UE which offload policy of the one or more offload policies to implement.

In Example 22, a method for offloading UE traffic from an eNodeB includes obtaining traffic load information about one or more WiFi access points.

In Example 23, the method of at least one of Examples 1-22 includes transmitting offload guidance information from the eNodeB to one or more UEs, the offload guidance information arranged to cause the UE to request the eNodeB to offload traffic flows of the one or more UEs that are on the eNodeB with a certain probability.

In Example 24, method of at least one of Examples 1-23 includes receiving from a UE of the one or more UEs a request to move at least some UE traffic flows from the eNodeB to a WiFi access point of the one or more WiFi access points.

In Example 25, transmitting offload guidance information of at least one of Examples 1-24 includes transmitting a probabilistic offload seed to the one or more UEs.

In Example 26, transmitting offload guidance information of at least one of Examples 1-25 includes transmitting an emergency indicator that indicates to offload UE traffic flows from the eNodeB to the WiFi access point with a probability of one.

In Example 27, transmitting offload guidance information of at least one of Examples 1-26 includes broadcasting the offload guidance information to the one or more UEs.

In Example 28, transmitting offload guidance information of at least one of Examples 1-27 includes unicasting the offload guidance information to a UE of the one or more UEs.

In Example 29, the method of at least one of Examples 1-28 includes transmitting a request for a UE of the one or more UEs to make a measurement, the measurement including one or more of a received signal strength indication, a signal to noise ratio, a percentage of missed beacons, a velocity, a position, a frame or packet error rate, or a data rate.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the disclosed subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The functions or algorithms described herein are implemented in hardware, software, or a combination of software and hardware in some embodiments. The software can comprise computer executable instructions stored on computer readable media such as memory or other type of storage devices. Further, described functions can correspond to modules, which can be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, process flows can be applicable to software, firmware, and hardware implementations.

Systems and methods of the present disclosure can be implemented on a mobile device as a mobile application, web-based application, on a desktop computer as a computer application, or a combination thereof. A mobile application can operate on a Smartphone, tablet computer, portable digital assistant (PDA), ruggedized mobile computer, or other mobile device. The mobile device can be connected to the Internet or network via Wi-Fi, Wide Area Network (WAN), cellular connection, WiMax, Serial Front Panel Data Port (Serial FPDP), Rapid I/O (Input/Output) Transport, or any other type of wired or wireless method of networking connection. In some embodiments, a web-based application can be delivered as a software-as-a-service (SaaS) package (e.g. cloud-based embodiments) accessible via a device app, a web browser application, or other suitable application, depending on the particular embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. An enhanced Node B (eNodeB) comprising:
   processing circuitry arranged to obtain traffic load information of one or more WiFi access points within a coverage area of the eNodeB and produce corresponding offload guidance information, the traffic load information includes information about user equipment (UE) traffic flows on the one or more WiFi access points; and
   a transceiver arranged to transmit the offload guidance information to one or more UEs and arranged to receive a request from at least one of the UEs to move at least some of the UE traffic flows to one of the WiFi access points,
   wherein the offload guidance information includes a probabilistic offload seed, wherein the probabilistic offload seed is a randomization number which is used to determine a probability of traffic flows from the one or more UEs being offloaded to the WiFi access point.

2. The eNodeB of claim 1, wherein the offload guidance information includes data representative of one or more parameters related to a WiFi access point of the one or more WiFi access points, the parameters including one or more of (1) a WiFi access point identifier, (2) an offload preference level for the WiFi access point, (3) a traffic load level on the WiFi access point, (4) frequency bands allowed on the WiFi access point, or (5) a max data rate of the WiFi access point.

3. The eNodeB of claim 1, wherein the offload guidance information includes an offload preference level for the one or more WiFi access points that a UE of the one or more UEs can request to switch traffic flows to.

4. The eNodeB of claim 1, wherein the offload guidance information includes common guidance information that is eNodeB independent, the common guidance information including one or more of: (1) a minimum quality of service class identifier, (2) an emergency indicator; (3) a switching hysteresis value; or (4) a policy index.

5. The eNodeB of claim 1, wherein the traffic flows on the eNodeB includes one or more service flows, and the offload guidance information includes a minimum quality of service class identifier indicating which service flows of the one or more service flows can apply the offload guidance information and request to switch to a specific access point.

6. The eNodeB of claim 1, wherein the offload guidance information includes an index to an offload policy of a plurality of offload policies on a UE of the one or more UEs.

7. The eNodeB of claim 1, wherein the offload guidance information includes an emergency indicator that indicates to the UE to request to switch UE traffic flows from the eNodeB to a WiFi access point of one or more WiFi access points unconditionally.

8. The eNodeB of claim 1, wherein the offload guidance information includes a switching hysteresis value, wherein the switching hysteresis value is arranged to avoid the UE repeatedly switching from and to the eNodeB or WiFi access point.

9. User Equipment (UE) comprising:
   a transceiver arranged to receive offload guidance information, from an enhanced Node B (eNodeB) or a WiFi access point, when the UE has traffic on the eNodeB or WiFi access point and when the UE is in idle mode; and
   a memory including one or more offload policies stored thereon, wherein the UE is arranged to request the eNodeB or WiFi access point to offload at least some of the UE's traffic on the eNodeB or the WiFi access point to the WiFi access point or eNodeB as a function of the offload guidance information and the one or more offload policies,
   wherein the offload guidance information includes a probabilistic offload seed and wherein the UE is arranged to calculate a random number as a function of the probabilistic offload seed and request to offload at least some of its traffic from the eNodeB or the WiFi access point as a function of the random number.

10. The UE of claim 9, wherein the offload guidance information includes one or more of an emergency indicator, a policy index, or a switching hysteresis value.

11. The UE of claim 9, wherein when the random number is above a threshold the UE will request the eNodeB or the WiFi access point to offload the UE's traffic that is at or above a minimum quality of service class identifier.

12. The UE of claim 10, wherein the emergency indicator indicates that the UE is to unconditionally transmit a request to offload its traffic from the eNodeB or WiFi access.

13. The UE of claim 10, wherein the switching hysteresis value is arranged to avoid the UE repeatedly requesting to switch traffic from and to the eNodeB or WiFi access point.

14. The UE of claim 10, wherein the policy index indicates to the UE which offload policy of the one or more offload policies to implement.

15. A method for offloading user equipment (UE) traffic from an enhanced Node B (eNodeB) comprising:
   obtaining, at the eNodeB, traffic load information about one or more WiFi access points; and
   transmitting offload guidance information from the eNodeB to one or more UEs, the offload guidance information arranged to cause the one or more UEs to request the eNodeB to offload traffic flows of the one or more UEs with a certain probability,
   wherein the offload guidance information includes a probabilistic offload seed, wherein the probabilistic offload seed is a randomization number which is used to determine a probability of traffic flows from the one or more UEs being offloaded to the WiFi access point.

16. The method of claim 15, further comprising:
   receiving from a UE of the one or more UEs a request to move at least some UE traffic flows from the eNodeB to a WiFi access point of the one or more WiFi access points.

17. The method of claim 15, wherein transmitting offload guidance information includes transmitting an emergency indicator that indicates to offload UE traffic flows from the eNodeB to the WiFi access point with a probability of one.

18. The method of claim 15, wherein transmitting offload guidance information includes broadcasting the offload guidance information to the one or more UEs.

19. The method of claim 15, wherein transmitting offload guidance information includes unicasting the offload guidance information to a UE of the one or more UEs.

20. The method of claim 15, further comprising transmitting a request for a UE of the one or more UEs to make a measurement, the measurement including one or more of a received signal strength indication, a signal to noise ratio, a percentage of missed beacons, a velocity, a position, a frame or packet error rate, or a data rate.

* * * * *